No. 730,231.

Patented June 9, 1903.

UNITED STATES PATENT OFFICE.

HENRY PAUL BUSCH, OF PHILADELPHIA, PENNSYLVANIA.

ANTISEPTIC AND DEODORIZING COMPOUND.

SPECIFICATION forming part of Letters Patent No. 730,231, dated June 9, 1903.

Application filed March 28, 1903. Serial No. 149,954. (No specimens.)

*To all whom it may concern:*

Be it known that I, HENRY PAUL BUSCH, a citizen of the United States, and a resident of the city of Philadelphia, State of Pennsylvania, have invented certain new and useful Improvements in Antiseptic and Deodorizing Compounds, of which the following is a full, clear, and complete disclosure.

My invention relates to new and useful compounds for deodorizing, fumigating rooms, buildings, and other inclosed spaces, and which also may be used as an antiseptic or germicide for sterilizing all articles which are required to be kept in a perfectly clean condition.

The object of my invention is to provide a compound which will retain all the active qualities of formaldehyde and which at the same time may be diluted, so as to become harmless in handling.

Another object of my invention is to provide such a combination that all the elements of the compound will have some beneficial action, while at the same time all of said elements will be stable and not liable to suffer decomposition by the interaction of the different substances.

Formalin as found in the open market has a strength of about forty per cent. of absolute formaldehyde. To render this sufficiently weak to be harmless to persons using the same, it is necessary to dilute the commercial solution sufficiently to make it contain about five per cent. of absolute formaldehyde. When diluted with water to form a solution of this strength, the formaldehyde is so far weakened in its active properties that its value as an antiseptic and deodorizing agent are much lessened.

In order to overcome the disadvantages due to the weakening of the solution by dilution, I add a solution of chlorid of zinc, which latter solution is of a strength equal to dissolving fifty pounds of chlorid of zinc in one hundred and eighty gallons of water. To this solution may also be added two pounds of chlorinated lime and small quantities of other active antiseptic and preservative substances—such as alum, sodium chlorid, calcium chlorid, and potassium chlorid—in quantities ranging from one and a half to six pounds to the quantity of water above mentioned.

The solution above mentioned should contain when ready for use about five per cent. of absolute formaldehyde.

By the compound thus produced an antiseptic and deodorizing solution is made available which has all the beneficial qualities of a stronger solution of formaldehyde, while at the same time the solution has advantages due to combining the formaldehyde with other active deodorizing, antiseptic, and preservative agents. The particular arrangement or quantities of the elements forming my improved compound also provides such a solution that the formaldehyde is not decomposed or its chemical efficiency impaired by mixing with it other chemicals which give additional beneficial qualities.

A solution which I have found to be of excellent quality and efficiency may be prepared as follows: Zinc chlorid, fifty pounds; alum, six pounds; sodium chlorid, six pounds; chlorinated lime, two pounds; calcium chlorid, two and one-fourth pounds; potassium, one and one-half pounds; water, one hundred and eighty gallons; formaldehyde, to make five per cent. of absolute formaldehyde.

I do not wish to be limited to the exact proportion and arrangement of substances as herein set forth, for the same may be varied so as to retain the advantageous results of my compound and yet be within the scope of my invention.

Having thus described my invention, what I claim, and desire to protect by Letters Patent of the United States, is—

1. A solution containing formaldehye and chlorid of zinc.

2. A solution in water of formaldehyde and chlorid of zinc.

3. A solution of chlorid of zinc containing five per cent. of absolute formaldehyde.

4. A solution containing five per cent. of formaldehyde and chlorid of zinc in the proportion of one pound to 3.6 gallons of water.

5. A solution comprising dilute formaldehyde, chlorid of zinc, and chlorinated lime.

6. A solution comprising five per cent. of absolute formaldehyde, chlorid of zinc in the proportion of one pound to 3.6 gallons of the solution, and chlorinated lime in the proportion of one pound to ninety gallons of the solution.

7. A solution comprising formaldehyde, chlorid of zinc, calcium chlorid, alum, sodium chlorid, potassium chlorid and water.

8. A solution comprising the following elements in the following proportions—formaldehyde five per cent., chlorid of zinc fifty pounds, alum six pounds, sodium chlorid six pounds, chlorinated lime two pounds, calcium chlorid two and one-fourth pounds, potassium chlorid one and one-half pounds, and water one hundred and eighty gallons.

In testimony whereof I have signed my name to this specification in the presence of two subscribing witnesses.

HENRY PAUL BUSCH.

Witnesses:
 JOHN F. GRADY,
 HORACE PETTIT.